United States Patent [19]
Steen, Jr.

[11] Patent Number: 6,015,497
[45] Date of Patent: Jan. 18, 2000

[54] FILTRATION SYSTEM AND METHOD FOR REMOVING BIOLOGICAL WASTES FROM AQUACULTURE TANKS

[76] Inventor: Albert Charles Steen, Jr., 125 N. Main St., Abbeville, La. 70510

[21] Appl. No.: 08/992,666

[22] Filed: Dec. 17, 1997

[51] Int. Cl.[7] .................................................. C02F 3/08
[52] U.S. Cl. ......................... 210/618; 210/795; 210/138; 210/150; 210/169
[58] Field of Search .................................. 210/615–618, 210/150, 151, 169, 620, 138–140, 795

[56] References Cited

U.S. PATENT DOCUMENTS

| | | | |
|---|---|---|---|
| 4,115,266 | 9/1978 | Oshima | 210/786 |
| 5,478,473 | 12/1995 | Oshima | 210/618 |
| 5,593,574 | 1/1997 | VanToever | 210/150 |
| 5,618,431 | 4/1997 | Kondo et al. | 210/618 |
| 5,750,041 | 5/1998 | Hirane | 210/618 |
| 5,770,080 | 6/1998 | Malone | 210/618 |

*Primary Examiner*—Thomas G. Wyse
*Attorney, Agent, or Firm*—Onebane, Bernard, Torian, Diaz, McNamara & Abell; Joseph L. Lemoine; Greg R. Mier

[57] ABSTRACT

A bio-treatment system for removing biological wastes from man-made tanks used to commercially cultivate aquatic animals. The system includes an aqua-culture tank in combination with a filtration tank wherein a screen is attached internally across the cross-section of the filtration tank above a buoyant filter media contained inside the filtration tank, the screen located at a higher level than a water level in the aqua-culture tank. Filtering of the water is accomplished by pumping water from the aqua-culture tank upwardly through the filtration tank and the buoyant filter media in the filtration tank. The filtered water flows out the top of the filtration tank and flows by gravity back to the aqua-culture tank. In order to periodically clean the buoyant filter media of accumulated wastes, water flow is stopped, allowing the water level in the filtration tank to lower and equalize with the water level in the aqua-culture tank, thereby allowing the buoyant filter media to drop away from the screen to form a floating, loose configuration of beads or pellets. The loosened buoyant filter media can be effectively agitated to dislodge the accumulated wastes, without using mechanical agitation devices, by injecting air or other gas into the filtration tank and through the buoyant filter media. Thereafter dislodged wastes are precipitated, discharged from the bio-treatment system and circulation resumed through cleaned filter media.

20 Claims, 1 Drawing Sheet

FILTRATION SYSTEM AND METHOD FOR REMOVING BIOLOGICAL WASTES FROM AQUACULTURE TANKS

BACKGROUND

1. Field of the Invention

The subject invention relates generally to systems designed to remove biological wastes from water reservoirs used to commercially cultivate aquatic animals. More particularly, it relates to systems which utilize a buoyant filter media to remove suspended biological matter, optimize nitrification, and to reduce biochemical oxygen demand (BOD) in large, man-made tanks used to commercially cultivate aquatic animals.

2. Description of Related Art

Commercial cultivation of aquatic animals can be a profitable business due to the existence of substantial demand for certain such animals for human consumption and enjoyment. For example, a fish suitable for commercial cultivation, known as "tilapia," has recently become increasingly popular for human consumption. The tilapia is a freshwater fish imported from Africa. Because of its foreign origin, some states prohibit introduction of the tilapia into their waterways. Consequently, fish farmers operating in these states are required to raise tilapia in man-made tanks instead of earthen ponds.

The primary disadvantage of raising fish and other aquatic animals in man-made tanks is the absence of any system for treating the biological waste generated by the fish. Without an adequate system for treating the biological wastes in the water, such wastes build-up and cause the fish to become diseased and eventually die. An adequate treatment system is especially important in the fish farming business because farm raised fish are regularly maintained in high density populations and fed frequently to increase the yield of fish, thereby increasing the amount of biological waste that must be removed to maintain a healthy fish environment.

Numerous devices have been developed to remove biological wastes from water in which fish are raised. U.S. Pat. No. 5,573,663 to Junius et al. discloses use of a floating filter media in a closed filtration tank. An auger-type mechanism is used to continuously circulate a portion of the media into a quiet zone where solids trapped in the media settle out for disposal.

U.S. Pat. No. 5,126,042 to Malone discloses another closed filter using buoyant filter media. Due to the buoyancy of the media, and the placement of the media retainer with respect to the water level in the manmade tank, the media remains packed against the upper surface of the filter even when upflowing circulation is stopped, thereby requiring a rotating blade mechanism to agitate the media for removal of solids trapped therein.

U.S. Pat. No. 4,743,382 to Williamson et al. is not specifically directed to filtration of water in which fish are raised but discloses a type of filter using a buoyant filter media. Williamson et al. discloses a system which uses buoyant filter media for removal of suspended solids remaining in the water of a clarifier tank. In Williamson et al., the water of the clarifier tank is at a higher level than the filter media and a screen retaining the media, so as to cause gravity flow from the clarifier downward through an opening in the lower part of a wall and upward through the buoyant filter media which is contained in an annular compartment surrounding the clarifier tank. Williamson et al. shows various means for cleaning portions of the filter media by circulation, water jets, or periodic blasts of gas.

None of the aforesaid patents disclose a system wherein the level of the water in the filter tank may be equalized with the level of the water in the fish tank, the water level upon equalization being below the screen retaining the filter media, thereby eliminating the tendency of the buoyant properties of the filter media to compact the media against the retaining screen prior to agitation of the media for cleaning.

SUMMARY OF THE INVENTION

The present invention is a system for removing biological wastes from water contained in an aqua-culture tank used to commercially cultivate fish or other aquatic animals. The system generally includes an aqua-culture tank, a filtration tank, a circulation pump, a sludge pump and influent, effluent and sludge discharge lines.

More specifically, the system includes an aqua-culture tank with a water level suitable for raising fish and other aquatic animals for human consumption and enjoyment, in combination with a filtration tank disposed in relation to the level of the water being filtered so that when water circulation from the aqua-culture tank through the filtration tank is stopped, the level of water in the filtration tank drops below a screen in the filtration tank which retains the media during circulation, causing the media to loosen for easy agitation and cleaning thereof.

In the preferred embodiment, the filtration tank is elongated vertically and has an open top. Disposed between the open top of the filtration tank and the bottom of the filtration tank is a screen that spans the cross-section of the filtration tank, the screen having openings smaller than the size of the filter media particles, as will be later described herein. Disposed in the filtration tank below the screen is a particulate buoyant filter media, and below the top of the buoyant filter media, but substantially above the bottom of the filtration tank, is an influent water distribution manifold. When water is circulated from the aqua-culture tank into the filtration tank, upwardly through the filtration tank and back into the aqua-culture tank, the buoyancy of the filter media and upflow of water in the filtration tank compact the filter media against the screen causing the filter media to form an effective filter bed.

When cleaning of the filter bed is necessary, water circulation is stopped, causing the level of water in the filtration tank to equalize with the level of water in the aqua-culture tank and thus drop below the retaining screen, thereby loosening the filter bed for effective agitation thereof. Agitation of the loosened, floating media may be accomplished by flowing gas (in the preferred embodiment, a flow of air) upward through a region of the filter bed, causing the media to circulate in a toroid shaped pattern of loose media particles.

This agitation causes trapped biological wastes to be dislodged, and the dislodged biological wastes settle by gravity into a sludge at the bottom of the filtration tank and are removed with a sludge pump through a sludge outlet line.

Advantages and objects of the invention will become apparent to those skilled in the art upon reviewing the following detailed description, the drawings and appended claims.

DESCRIPTION OF THE PREFERRED EMBODIMENT

Figure 1:
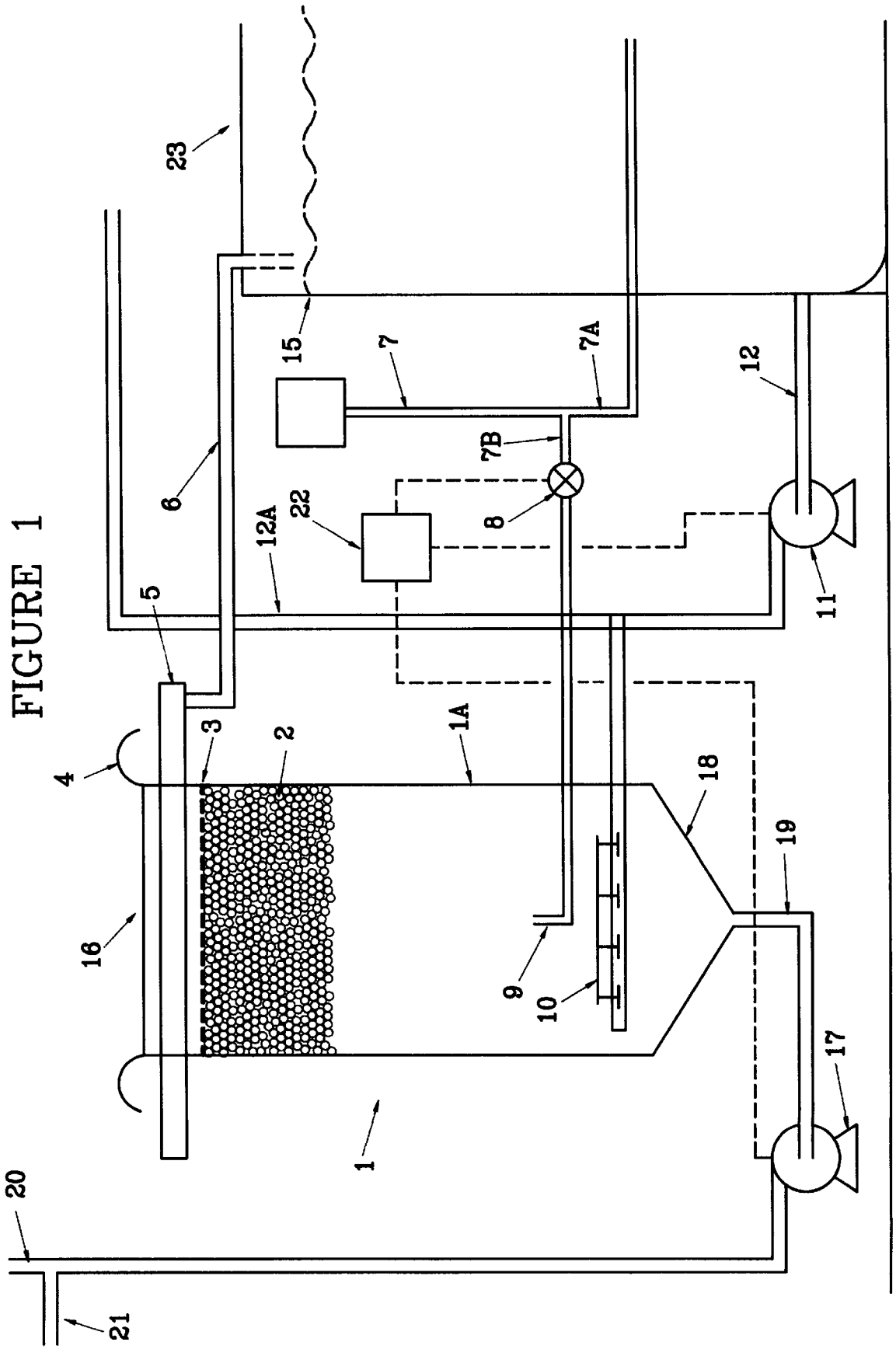
FIG. 1 is a schematic flow diagram of the invention.

Although the present invention is sometimes described herein in terms of an aqua-culture for fish, it is understood that other applications are possible.

The system herein disclosed and claimed preferably includes an aqua-culture tank 23 containing water for containing aquatic animals for human consumption and enjoyment, a filtration tank 1, a circulating pump 11, a sludge pump 17, a gas supply 7, a filtration tank influent line 12, a filtration tank effluent line 6 and a sludge discharge line 19.

In the preferred embodiment, aqua-culture tank 23 is a tank of man-made construction using wood, concrete, fiberglass or other sturdy building materials suitable for containing large quantities of water. Aqua-culture tank 23 may be lined with plastic or other water impervious material. Typically, aqua-culture tank 23 would be disposed above ground, but it may be recessed in the earth provided filtration tank 1 is disposed at a suitable relative height as will be hereinafter disclosed. In aqua-culture tank 23 is a level of water 15 suitable for raising fish and other aquatic animals.

Preferably located sufficiently near aqua-culture tank 23 so that line pressure losses are minimized is filtration tank 1. In the preferred embodiment, filtration tank 1 is constructed of fiberglass, but any corrosion resistant material suitable for containing water which is not harmful to aquatic animals, such as many metals, concrete, or even wood, may be used. In the preferred embodiment, filtration tank 1 has an open top 16, a sidewall 1A, and a bottom 18 that funnels toward sludge outlet line 19. In another embodiment, top 16 of filtration tank 1 may be covered, but if covered, has a means for admission of air when circulation of water through filtration tank 1 is stopped. Top 16 of filtration tank 1 is positioned above water level 15 in aqua-culture tank 23 permitting the return of water from filtration tank 1 to aqua-culture tank 23 by gravity flow.

A screen 3 is disposed inside filtration tank 1 and spans the cross-section of filtration tank 1 at a level which is above the level of water 15 in aqua-culture tank 23. Screen 3 is preferably constructed of stainless steel mesh, but other suitably strong, corrosion resistant material can be used. A buoyant filter media 2, preferably of low density polyethylene granulated beads or pellets which form effective mechanical filters when sufficiently compacted, and with surfaces that are conducive for attachment of nitrifying bacteria, is suspended in water below screen 3. So disposed, buoyant filter media 2 compacts against screen 3 when water is flowed upward through filtration tank 1.

Filtration tank influent line 12 fluidly connects aqua-culture tank 23 to filtration tank 1. Means such as grating, netting, or perforated pipe for preventing aquatic animals from entering filtration tank influent line 12 is placed over the opening where a first end of said influent line 12 is connected to aqua-culture tank 23. A second end of filtration tank influent line 12 is connected to filtration tank 1 through an opening which is disposed above bottom 18 of filtration tank 1 a sufficient distance to allow the quantity of biological waste solids expected to be trapped in buoyant filter media 2 to settle below said filtration tank influent line 12, and disposed below the buoyant filter media 2. The second end of filtration tank influent line 12 is coupled to an influent water distribution manifold 10 having openings so as to disburse the circulating water in a manner which does not disturb buoyant filter media 2 during circulation. In the preferred embodiment, filtration tank influent line 12 splits into a water return line 12A between circulating pump 11 and filtration tank 1. Water return line 12A rises to a height above the maximum water level in filtration tank 1 and then discharges back into aqua-culture tank 23.

Circulating pump 11 is fluidly coupled to filtration tank influent line 12 between aqua-culture tank 23 and filtration tank 1. Circulating pump 11 is preferably located at or near the level of the bottom of aqua-culture tank 23 so that the suction head at circulating pump 11 is maximized.

In the preferred embodiment, water flows upward through buoyant filter media 2, where suspended solids are filtered from the water. Cleaned water overflows filtration tank 1 over lip 4 and into a collection tray 5, which is sealably attached circumferentially around the outer surface of filtration tank 1 near top 16 of filtration tank 1. Collection tray 5 is fluidly connected to a filtration tank effluent line 6, which gravity drains the circulating water back into aqua-culture tank 23. In another embodiment not shown, water overflows out filtration tank 1 through one or more ports disposed in sidewall 1A of filtration tank 1 above screen 3, which side ports gravity drain back to aqua-culture tank 23.

When buoyant filter media 2 requires cleaning, circulation pump 11 is stopped, thereby permitting water to flow back through filtration tank influent line 12 into aqua-culture tank 23 (circulating pump 11 being of a type which allows backflow therethrough when stopped), further permitting the level of water in filtration tank 1 to equalize with water level 15 in aqua-culture tank 23. No valving is necessary in filtration tank influent line 12 due to the relative positioning of the top of aqua-culture tank 23 and filtration tank 1. Top 16 of filtration tank 1 is disposed above screen 3, which screen 3 is above water level 15 in aqua-culture tank 23, thus top 16 of filtration tank 1 is at a level above water level 15 in aqua-culture tank 23. The equalization process lowers the water level in filtration tank 1 to a level below the level of screen 3, thereby allowing buoyant filter media 2 to drop away from screen 3 to form a loose configuration of floating beads or pellets loosely suspended near the top of the water in filtration tank 1. Such loosened buoyant filter media 2 may be effectively agitated by numerous means, the agitation serving to cause particulate matter trapped within buoyant filter media 2 to fall free to bottom 18.

In the preferred embodiment, loosened buoyant filter media 2 is agitated by upflow of air through a gas supply line 7B which terminates with an open end 9 disposed substantially in the cross-sectional center of filtration tank 1 below the buoyant filter media 2. A solenoid valve 8, which is coupled to gas supply line 7B, controls the flow of air to filtration tank 1. As the injected air forms bubbles and floats upward, buoyant filter media 2 is forced upward around the air bubbles and flows back down about the sides of filtration tank 1. This movement creates an upward flow of water in a zone above end 9 of gas supply line 7B and a downward countercurrent of water about the sides of filtration tank 1, causing a toroid shape flow of water and buoyant filter media 2 to swirl within filtration tank 1 and effectively cause suspended solids to become dislodged from buoyant filter media 2. It is to be understood that placement of end 9 of gas supply line 7B may be at locations other than the cross-sectional center of filtration tank 1, and still result in effective agitation of buoyant filter media 2 through injection of air or other gases. Additionally, although air is described as the agitating gas in the preferred embodiment, other gases may be used.

Bottom 18 of filtration tank 1 is shaped so as to funnel toward sludge outlet line 19. Sludge pump 17, for removing sludge from bottom 18 of filtration tank 1, is fluidly coupled to sludge outlet line 19. Sludge outlet line 19 exits bottom 18 of filtration tank 1 and then turns upward and runs in a substantially vertical direction to an outlet 21 which has air break 20 thereon. In the preferred embodiment, outlet 21 is disposed at a height which is greater than the maximum height of water return line 12A. Sludge pump 17 has an operating head pressure greater than the pressure exerted by a fluid column having a height equal to the height of outlet 21, in order to be able to discharge sludge therefrom. Such arrangement eliminates the need for any valving in sludge outlet line 19.

In the preferred embodiment, an automatic timer 22 is connected to solenoid valve 8, circulating pump 11, and sludge pump 17, and controls the sequence of the different phases of operation during the filtration process. Automatic timer 22 opens and closes solenoid valve 8 during the agitation process. Automatic timer 22 also deactivates and activates circulating pump 11 at the beginning and end of the agitation phase. Likewise, automatic timer 22 activates and deactivates sludge pump 17 to remove the accumulated sludge from the bottom 18 of filtration tank 1.

To use the apparatus, water is circulated from aqua-culture tank 23 through filtration tank influent line 12 and into filtration tank 1. As the water flows upwardly through filtration tank 1, buoyant filter media 2 rises until it compacts against screen 3. The compacted buoyant filter media 2 effectively traps suspended biological solid wastes contained in the water from aqua-culture tank 23. Nitrifying bacteria attached to buoyant filter media 2 convert harmful wastes entrained in the liquid to harmless substances. After passing through buoyant filter media 2, the circulating water overflows out of filtration tank 1 and is gravity drained back to aqua-culture tank 23.

Periodically, buoyant filter media 2 must be agitated to remove any accumulated biological waste. Before the agitation process begins, the water level in filtration tank 1 is allowed to equalize with water level 15 in aqua-culture tank 23. This equalization process allows buoyant filter media 2 to drop away from screen 3 and expand into a loose configuration of beads or pellets, permitting effective agitation.

Thereafter, gas is introduced into filtration tank 1 through gas supply line 7B below the bed of buoyant filter media 2 generating bubbles, preferably larger bubbles, creating substantial agitation of buoyant filter media 2 while flowing up through buoyant filter media 2. Buoyant filter media 2 are thereby forced to rise upward with the gas bubbles and then flow down around the sides of filtration tank 1.

As buoyant filter media 2 swirls around filtration tank 1 in a toroidal pattern under agitation by the large gas bubbles, biological waste is dislodged from buoyant filter media 2 and settles into a sludge at bottom 18 of the filtration tank 1. After agitation, gas flow is stopped and filtration tank 1 is allowed to become quiescent for sufficient time (typically several minutes) to allow the dislodged solid wastes to settle into a sludge in bottom 18 of filtration tank 1. After settling, sludge pump 17 is activated to remove the sludge. The system conserves water by discharging the minimum amount of water necessary to sufficiently remove the sludge. Once the sludge is removed, the circulation process is restarted until the next cleaning cycle (typically several hours) is repeated.

The foregoing description is illustrative and exemplary of the invention and various changes may be made without departing from the scope and spirit of the invention. Therefore, the scope of the invention is to be determined by the appended claims and their legal equivalents, rather than by the examples given.

I claim:

1. A system for the filtration of water used for cultivating aquatic animals, comprising:

(a) an aqua-culture tank containing a level of water therein;

(b) a filtration tank elongated vertically which has a top at a height above the level of water in the aqua-culture tank, a bottom, a horizontal cross-section and a screen having openings, which said screen spans said horizontal cross-section of said filtration tank below said top and at a height above the level of water in the aqua-culture tank;

(c) a bed of buoyant filter media comprised of particles which are larger than the openings in said screen, said bed having a top and a bottom disposed below said screen;

(d) a filtration tank influent line fluidly connecting said aqua-culture tank to a point in said filtration tank which is below the bed of buoyant filter media;

(e) a circulation pump disposed in said filtration tank influent line;

(f) a gas supply line connected to a point in said filtration tank which is below the bed of buoyant filter media; and (g) a filtration tank effluent line fluidly connecting a point in said filtration tank above said screen to said aqua-culture tank;

whereby, when water is being pumped upwardly through said filtration tank said buoyant filter media is constrained by said screen, but when water is not being pumped a water level in said filtration tank equalizes with said water level in said aqua-culture tank, thereby permitting said buoyant filter media to float loosely in said water for ease of agitation.

2. The apparatus of claim 1, further comprising:

(h) a sludge discharge line fluidly connecting said bottom of said filtration tank to an atmospheric discharge disposed at a height which is above the top of the filtration tank to prevent water within said filtration tank from draining out of said discharge line without having to install a valve in said discharge line; and (i) a sludge pump disposed in said sludge discharge line, said sludge pump having an operating hydrostatic head pressure greater than the pressure imposed by a column of water having a height equal to said height of said atmospheric discharge.

3. The apparatus of claim 2 wherein said top of said filtration tank is open to atmosphere, thereby permitting overflow into said filtration tank effluent line.

4. The apparatus of claim 3, further comprising a by-pass conduit fluidly connecting said filtration tank influent line and said aqua-culture tank, where said by-pass conduit is fluidly connected to said filtration tank influent line between said circulation pump and said filtration tank and said by-pass conduit discharges into said aqua-culture tank at a height above said height of said top of said filtration tank, but below said height of said atmospheric discharge of said sludge discharge line, whereby when said buoyant filter media becomes plugged, water flowing through said filtration tank influent line is redirected through said by-pass conduit.

5. The apparatus of claim 4, further comprising an automatic timer connected to said circulating pump, said gas supply, and said sludge pump for automatically activating said circulating pump, said gas supply, and said sludge pump in a predetermined sequence.

6. The apparatus of claim 2 wherein said top of said filtration tank has a vacuum breaker.

7. The apparatus of claim 6, further comprising a by-pass conduit fluidly connecting said filtration tank influent line and said aqua-culture tank, where said by-pass conduit is fluidly connected to said filtration tank influent line between said circulation pump and said filtration tank and said by-pass conduit discharges into said aqua-culture tank at a height above said height of said top of said filtration tank, but below said height of said atmospheric discharge of said sludge discharge line, whereby when said buoyant filter media becomes plugged, water flowing through said filtration tank influent line is redirected through said by-pass conduit.

8. The apparatus of claim 7, further comprising an automatic timer connected to said circulating pump, said gas supply, and said sludge pump for automatically activating said circulating pump, said gas supply, and said sludge pump in a predetermined sequence.

9. The apparatus of claim 2, further comprising a by-pass conduit fluidly connecting said filtration tank influent line and said aqua-culture tank, where a first end of said by-pass conduit is fluidly connected to said filtration tank influent line between said circulation pump and said filtration tank, and a second end of said by-pass conduit discharges into said aqua-culture tank at a height above said height of said top of said filtration tank, but below said height of said atmospheric discharge of said sludge discharge line, whereby when said buoyant filter media becomes plugged, water flowing through said filtration tank influent line is redirected through said by-pass conduit.

10. The apparatus of claim 9, further comprising an automatic timer connected to said circulating pump, said gas supply, and said sludge pump for automatically activating said circulating pump, said gas supply, and said sludge pump in a predetermined sequence.

11. The apparatus of claim 1 wherein said top of said filtration tank is open to atmosphere, thereby permitting overflow into said filtration tank effluent line.

12. The apparatus of claim 1 wherein said top of said filtration tank has a vacuum breaker.

13. A method for the cleaning of buoyant filter media used to filter water in an aqua-culture tank, comprising the steps of:
   (a) providing a filtration tank elongated vertically which has a top at a height above the level of water in the aqua-culture tank, a bottom, a horizontal cross-section and a screen having openings, which said screen spans said horizontal cross-section of said filtration tank below said top and at a height above the level of water in the aqua-culture tank;
   (b) providing a bed of buoyant filter media comprised of particles which are larger than the openings in said screen;
   (c) providing a filtration tank influent line fluidly connecting said aqua-culture tank to a point in said filtration tank which is below the bed of buoyant filter media;
   (d) providing a circulation pump disposed in said filtration tank influent line;
   (e) providing a gas supply line connected to a point in said filtration tank which is below the bed of buoyant filter media;
   (f) providing a filtration tank effluent line fluidly connecting a point in said filtration tank above said screen to said aqua-culture tank;
   (g) operating said circulation pump to circulate water from said aqua-culture tank upward through said bed of buoyant filter media until said bed of buoyant filter media requires cleaning;
   (h) loosening the bed of buoyant filter media from said screen by stopping said circulation pump, thereby allowing gravity to lower the water in the filtration tank until it is equalized with the level of water in the aqua-culture tank below said screen; and
   (i) agitating the loosened buoyant filter media by upflow of gas therethrough.

14. The method of claim 13, further comprising the steps of:
   (j) providing a sludge discharge line fluidly connecting said bottom of said filtration tank to an atmospheric discharge disposed at a height which is above the top of the filtration tank to prevent said filtration tank from draining out of said discharge line without having to install a valve in said discharge line; and
   (k) providing a sludge pump disposed in said sludge discharge line, said sludge pump having an operating hydrostatic head pressure greater than the pressure imposed by a column of water having a height equal to said height of said atmospheric discharge.

15. The method of claim 14, further comprising the steps of providing a by-pass conduit fluidly connecting said filtration tank influent line and said aqua-culture tank, where said by-pass conduit is fluidly connected to said filtration tank influent line between said circulation pump and said filtration tank and said by-pass conduit discharges into said aqua-culture tank at a height above said height of said open top of said filtration tank, but below said height of said atmospheric discharge of said sludge discharge line, whereby when said buoyant filter media becomes plugged, water flowing through said filtration tank influent line is redirected through said by-pass conduit.

16. The method of claim 15, further comprising the steps of providing an automatic timer connected to said circulating pump, said gas supply, and said sludge pump for automatically activating said circulating pump, said gas supply, and said sludge pump in a predetermined sequence.

17. A filtration tank for removing suspended particles of biological wastes from water contained in an aqua-culture tank, said water forming a water level therein, comprising:
   (a) a filtration tank elongated vertically which has a top at a height above the level of water in the aqua-culture tank, a bottom, a horizontal cross-section and a screen having openings, which said screen spans said horizontal cross-section of said filtration tank below said top and at a height above the level of water in the aqua-culture tank;
   (b) a bed of buoyant filter media comprised of particles which are larger than the openings in said screen, said bed having a top and a bottom disposed below said screen;
   (c) a filtration tank influent line fluidly connecting said aqua-culture tank to a point in said filtration tank which is below the bed of buoyant filter media;
   (d) a circulation pump disposed in said filtration tank influent line;
   (e) a gas supply line connected to a point in said filtration tank which is below the bed of buoyant filter media; and
   (f) a filtration tank effluent line fluidly connecting a point in said filtration tank above said screen to said aqua-culture tank;
   whereby, when water is being pumped upwardly through said filtration tank said buoyant filter media is constrained by said screen, but when water is not being pumped a water level in said filtration tank equalizes with said water level in said aqua-culture tank, thereby permitting said buoyant filter media to float loosely in said water for ease of agitation.

18. The filtration tank of claim 17, further comprising:

(g) a sludge discharge line fluidly connecting said bottom of said filtration tank to an atmospheric discharge disposed at a height which is above the top of the filtration tank to prevent said filtration tank from draining out of said discharge line without having to install a valve in said discharge line; and (h) a sludge pump disposed in said sludge discharge line, said sludge pump having an operating hydrostatic head pressure greater than the pressure imposed by a column of water having a height equal to said height of said atmospheric discharge.

19. The apparatus of claim 18, further comprising a by-pass conduit fluidly connecting said filtration tank influent line and said aqua-culture tank, where said by-pass conduit is fluidly connected to said filtration tank influent line between said circulation pump and said filtration tank and said by-pass conduit discharges into said aqua-culture tank at a height above said height of said open top of said filtration tank, but below said height of said atmospheric discharge of said sludge discharge line, whereby when said buoyant filter media becomes plugged, water flowing through said filtration tank influent line is redirected through said by-pass conduit.

20. The apparatus of claim 19, further comprising an automatic timer connected to said circulating pump, said gas supply, and said sludge pump for automatically activating said circulating pump, said gas supply, and said sludge pump in a predetermined sequence.

* * * * *